US012759591B1

(12) United States Patent
Garg et al.

(10) Patent No.: US 12,759,591 B1
(45) Date of Patent: Oct. 13, 2026

(54) OCCLUSION DETECTION AND MONITORING

(71) Applicant: Zoox, Inc., Foster City, CA (US)

(72) Inventors: Lakshay Garg, Palo Alto, CA (US); Max Gier, Aachen (DE); Akash Arora, San Mateo, CA (US); Weifu Wang, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 255 days.

(21) Appl. No.: 18/359,800

(22) Filed: Jul. 26, 2023

(51) Int. Cl.
*B60W 60/00* (2020.01)
*B60W 40/04* (2006.01)

(52) U.S. Cl.
CPC ...... *B60W 60/00276* (2020.02); *B60W 40/04* (2013.01)

(58) Field of Classification Search
CPC ........................ B60W 60/00276; B60W 40/04
See application file for complete search history.

(56) References Cited

U.S. PATENT DOCUMENTS 10,133,275 B1 11/2018 Kobilarov et al.
11,048,265 B2 6/2021 Silva et al.
11,126,180 B1 * 9/2021 Kobilarov ....... B60W 30/18163
11,188,082 B2 11/2021 Silva et al.
2019/0122037 A1 * 4/2019 Russell ................ G06V 40/103
2019/0384309 A1 * 12/2019 Silva ....................... G01S 17/89
2020/0225669 A1 * 7/2020 Silva ....................... G01S 17/06
2021/0003691 A1 * 1/2021 Zaidi ......................... G01S 7/35

* cited by examiner

*Primary Examiner* — Khoi H Tran
*Assistant Examiner* — Tien Minh Le
(74) *Attorney, Agent, or Firm* — Lee & Hayes, P.C.

(57) ABSTRACT

Techniques are discussed for controlling a vehicle, such as an autonomous vehicle, based on occluded regions in an environment. A system may receive a path associated with an autonomous vehicle traversing an environment. A system may detect a road segment associated with an intersection of the path and a path of a potential object. A system may determine, based at least in part on a termination condition, a length along the road segment. A system may determine, based on environment data and sensor data associated with the autonomous vehicle, an occluded region along the road segment within the length. A system may determine whether the occluded region is relevant. A system may determine, based on a minimum time to collision and determining that the occluded region is relevant, a heatmap of cost values associated with the occluded region. A system may control the autonomous vehicle based on the heatmap.

20 Claims, 6 Drawing Sheets

OCCLUSION DETECTION AND MONITORING

BACKGROUND

Autonomous vehicles may use various techniques to navigate through driving environments including any number of obstacles. For instance, autonomous vehicles may utilize route planning methods to guide themselves autonomous vehicles through congested areas that may include other vehicles, buildings, pedestrians, and/or other objects. In some examples, vehicles, buildings, and/or objects in an environment can block areas of the environment from being visible to sensors of the autonomous vehicle, which can present challenges in planning a route through such areas.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
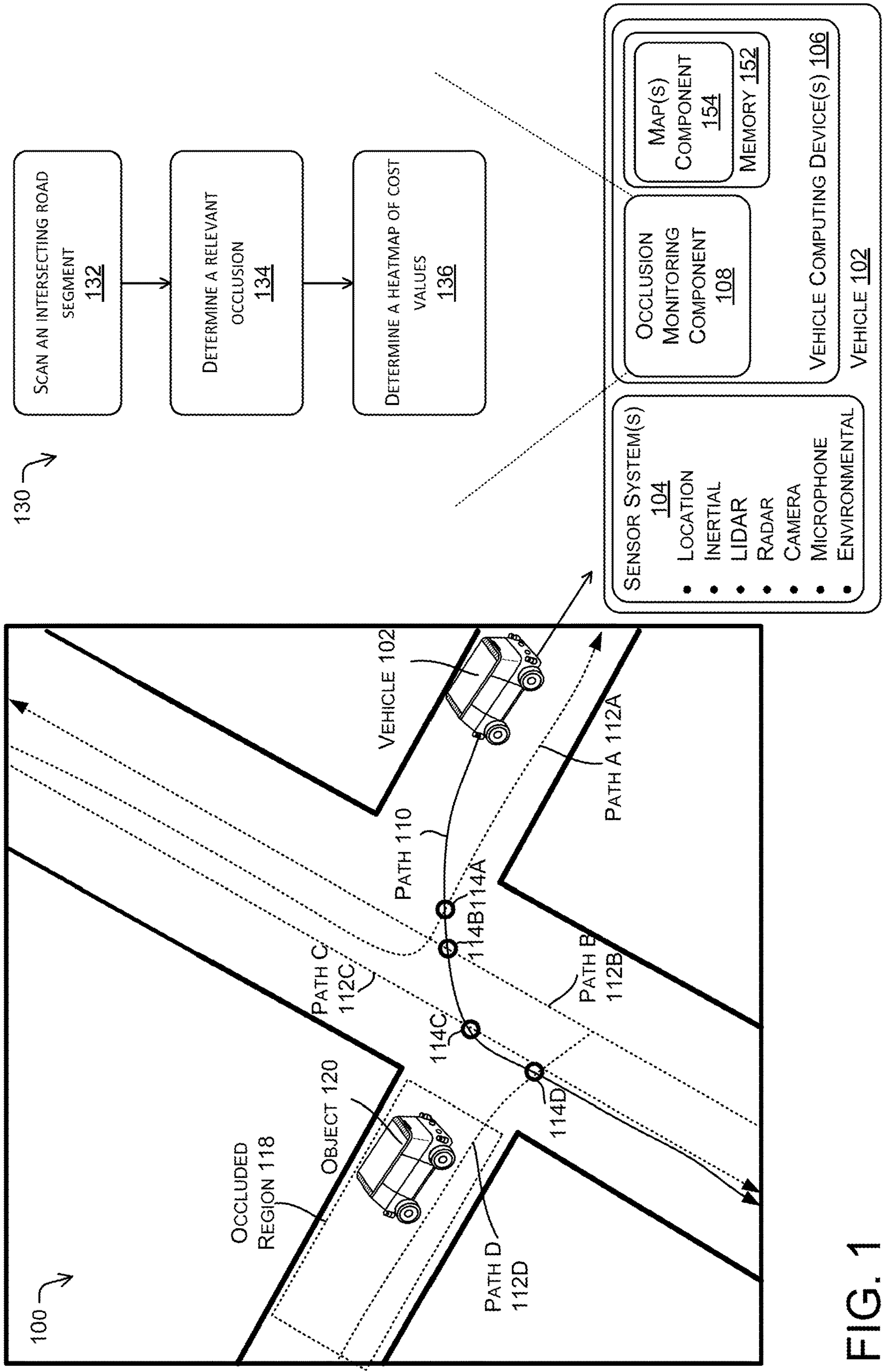
FIG. 1 depicts an environment in which the techniques described herein may be utilized.

The present document describes techniques for determining how to control a vehicle given occluded areas. A vehicle may utilize route planning methods, apparatuses, and systems to guide the vehicle through congested areas of an environment that include other objects, such as other vehicles, pedestrians, buildings, and/or the like. In some instances, a region of the environment near where the vehicle is navigating may be occluded (e.g., by an object, a building, or otherwise). The occlusion of a region proximate the vehicle may cause problems for the vehicle while navigating through the environment. For example, the object may block the field of view of the vehicle such that the vehicle cannot detect other objects (e.g., other vehicles or pedestrians) that may be potentially located within the occluded region and moving in a direction that may intersect with a trajectory of the vehicle.

In some cases, using the techniques described herein, an example system can select a trajectory that minimizes a cost value determined at least in part based on the likelihood that different trajectories may collide with a potential object in an occluded region. Accordingly, in some cases, the techniques described herein enable determining a trajectory for a vehicle based on safety considerations related to occluded regions. Moreover, in some cases, the techniques described herein enable monitoring the safety condition of a vehicle based at least in part on the likelihood that the path taken by the vehicle may lead to a collision with an object in an occluded region. For example, in some cases, the techniques described herein enable detecting that the vehicle's path has an above-threshold likelihood of collision with an object that is assumed to be in the occluded region. Based on this determination, the system may alert the driver, require manual intervention by the driver, or otherwise intervene (e.g., use within a planner component of an autonomous vehicle to follow other/different paths). Therefore, the techniques described herein improve the safety of occupants of a vehicle that incorporates the techniques discussed herein. Moreover, the techniques may improve the efficiency of the vehicle, such as an autonomous vehicle, in accomplishing a mission such as, for example, delivering passengers and/or cargo, surveying a region, or the like.

In some cases, the system scans along the path of a vehicle to detect an intersection with another path. In at least some such examples, only those intersections may be determined which are associated with a junction requiring a determination of right-of-way or priority. After detecting the intersection, the system scans along a road segment that extends from the intersection until a terminating condition (e.g., a terminating condition determined based on at least one of the distance of the road segment or the number of turns in the road segment) is reached. By scanning the road segment, the system can determine whether the scanned length of the road segment includes an occluded region (e.g., using map data, sensor data, etc.). If the scanned length includes an occluded region, the system may determine a travel time for an object that is assumed to be in the occluded region to a location in the vehicle environment. In some cases, the travel times for one or more locations in the vehicle environment can then be used to generate a heatmap of cost values for the vehicle environment. The heatmap can then be used to determine a cost measure for the vehicle's path. In some cases, as used herein, scanning a path, road, or road segment may include determining, based on at least one map data or sensor data associated with a vehicle environment, one or more features of the path, road, or road segment.

In some cases, the techniques described herein may include determining an intersection between the path of a vehicle (e.g., the path associated with a candidate trajectory that is being evaluated) and another path. In some cases, the system scans the vehicle's path (e.g., for a predetermined distance) to detect a set of intersections along the path. In some cases, the system then uses at least a subset (and possibly all) of those detected intersections as relevant intersections for further processing. For example, in some cases, the system adopts only those intersections at which the vehicle's path is expected to yield to an object as relevant intersections and discards other intersections. Examples of intersections at which the vehicle's path is expected to yield may include at least one of: (i) a right-on-red intersection (e.g., an intersection at which the vehicle's path includes a right turn while a traffic light associated with the intersection is red), (ii) an unprotected left turn intersection (e.g., at which the vehicle's path is expected to make a left turn that includes driving through an oncoming lane), (iii) an intersection with a path when the vehicle's path includes leaving a parking lane and/or a parking spot, or (iv) an intersection associated with the vehicle entering an oncoming lane.

In some cases, the system receives (e.g., from router scanner software that determines based on map data associated with the vehicle environment) a set of intersections along the vehicle's path. Subsequently, the system filters out at least one of the following from the set of intersections: (i) an intersection whose distance with respect to the vehicle's current position exceeds a threshold, (ii) an intersection in which the vehicle's path has junction-level right of way (e.g., a right of way with respect to all of the paths that pass through the intersection), (iii) an intersection that has a traffic light and is not a right-on-red intersection or an unprotected left turn intersection, or (iv) an intersection that does not have a traffic light and at which the vehicle's path has right of way with respect to all of the paths that pass through the intersection. In some cases, if the vehicle is off-road (e.g., in a parking spot and/or a parking lane) and the vehicle's path includes coming onto the road, the system includes the intersection with the road as a relevant intersection.

For example, in some cases, after receiving the set of intersections along the vehicle's path, the system first filters out those intersections whose distance with respect to the vehicle's position exceeds a threshold. In some examples, the system filters out those intersections at which the vehicle's path is indicated (e.g., based on data received from the route scanner software) to have junction-level right-of-way. With respect to each intersection at which the vehicle's path is indicated (e.g., based on data received from the route scanner software) to yield to at least one other intersecting path, the system performs the following operations: (i) if the intersection is a traffic light junction, the system only adopts the intersection as a relevant intersection only if the intersection is a right on red intersection or an unprotected left turn intersection, and (ii) if the intersection is not a traffic light junction, the system adopts the intersection as a relevant intersection only if the vehicle's path has lane-level right-of-way with respect to every other lane that passes through the intersection. Additionally, if the vehicle is off-road (e.g., in a parking spot and/or a parking lane) and the vehicle's path includes coming onto the road, the system includes the intersection with the road as a relevant intersection.

In some cases, the techniques described herein include detecting an intersecting road segment. In some cases, an intersecting road segment is a road segment associated with an intersection (e.g., a relevant intersection, such as an intersection that is determined to be a relevant intersection based on at least one of the techniques described herein), such as a road segment that passes through the intersection. For example, in some cases, the system may detect a set of intersections along a vehicle's path. After detecting a set of intersections, the system may determine each road segment that passes through at least one of the intersections.

In some cases, to detect the intersecting road segment(s), the system may use map data and/or data provided by route scanner software. In some cases, the system detects an intersecting road segment by communicating with a traffic management system and/or another vehicle that communicates with the traffic management system. Using a traffic management system may enable the system to obtain real-time information about a road network including any road closures. In some cases, the system may use sensor data about traffic conditions along with map data to predict road closures and use these predictions in determining intersecting road segments.

In some cases, an intersection that is associated with N roads is associated with N or more intersecting road segments. For example, consider an operational example in which, by scanning a first one-way road that is associated with a west-to-east direction passes through a first intersection at a first location. In addition, a second one-way road that is associated with a south-to-north direction intersects with the first road at a second location that is to the west of the first location. Furthermore, a third road that is associated with a north-to-south direction intersects with the first road segment at a third location that is to the west of the first location but to the east of the second location. In this example, the road network may include a first road segment associated with the east-to-west direction that includes: (a) at least a portion of the first road to the east of the first location and at least a portion of the first road to the west of the first location. The first road segment may further include a second road segment that includes: (a) in a south-to-north direction, at least a portion of the second road to the south of the second point, (b) in an east-to-west direction, at least a portion of the first road between the second point and the first point, and (c) an east-to-west direction, at least a portion of the first road to the west of the first point. The road network may include a third road segment that includes: (a) in an east-to-west direction, at least a portion of the first road to the west of the third location, and (b) in a north-to-south direction, at least a portion of the third road to the south of the third location. The road network may also include a fourth road segment that includes: (a) in a south-to-north direction, at least a portion of the second road to the south of the second point, (b) in an east-to-west direction, at least a portion of the first road between the second point and the third point, and (c) in a north-to-south direction, least a portion of the third road to the south of the third location. As this example illustrates, only the first and second road segments pass through the intersection of interest, which is the first intersection, while the third and fourth road segments do not pass through the intersection of interest. Accordingly, in some cases, with respect to the first intersection, the intersecting road segments may include the first and second road segments and exclude the third and fourth road segments.

In some cases, the system scans a road network starting from an intersection location and in the direction of all paths leading to the intersection until a terminating condition is reached. For example, in some cases, if an intersection is associated with N intersecting paths, then the system may scan along each of the N intersecting paths.

In some cases, the system scans along an intersecting road segment (e.g., each road segment that intersects with at least one intersection identified along a vehicle's path) until a terminating condition is reached. In some cases, scanning along a road segment is performed based on map data associated with the vehicle environment, such as a road network graph that includes nodes corresponding to roadway features such as intersections and directed edges corresponding to path segments between roadway features. In some cases, scanning along a road segment includes performing a graph expansion operation, for example a road network graph associated with the vehicle environment.

In some cases, an intersecting road segment is scanned starting from a location associated with the intersection and in both directions (e.g., starting from the intersection location and in accordance with the direction of the intersecting road segment, as well as starting from the intersection location and opposite of the direction associated with the road segment). Accordingly, in some cases, an intersecting road segment is associated with at least two scanned lengths: a length resulting from a scan starting from the intersection location until the terminating condition is reached in the direction associated with the intersecting road segment, and a length resulting from a scan starting from the intersection location until the terminating condition is reached opposite the direction associated with the intersecting road segment.

In some cases, scanning an intersecting road segment is stopped when a terminating condition is reached. The terminating condition may be defined based on at least one threshold number of predefined roadway features (e.g., turns, traffic lights, and/or the like) or a threshold distance. For example, in some cases, the system stops scanning a road segment in a particular direction when one of the following conditions is satisfied: (i) the scanned length includes a threshold number of turns (e.g., six turns), or (ii) the scanned length covers a threshold distance (e.g., one kilometer). As another example, the system stops scanning a road segment in a particular direction when both of the following conditions are satisfied: (i) the scanned length includes a threshold number of turns (e.g., six turns), or (ii) the scanned length covers a threshold distance (e.g., one kilometer). In some cases, the example system stops the scan after a threshold distance is scanned if a predefined arrangement of roadway features is not detected, but otherwise as soon as the predefined arrangement is detected.

In some cases, after scanning a length along an intersecting road segment, the system detects all the road segments that include at least a segment of the scanned length and pass through the intersection location. In some cases, scanning an intersecting road segment may lead to detection of two or more path segments as two or more path segments may cover at least a segment of the scanned length. In some cases, the system selects a subset of the detected path segments that pass through the intersection as a relevant path segment.

In some cases, the techniques described herein include determining whether at least a portion of an intersecting road segment (e.g., a scanned length along the road segment) includes an occluded region. In some cases, after detecting an intersecting road segment, the system scans along the road segment until a terminating condition is reached. The system then determines whether the scanned length includes an occluded region, for example based on sensor associated with the vehicle environment. In some cases, if an occluded region has an area that falls below a threshold (e.g., if an occluded region is too small to contain an object), then the system discards the occluded region as an irrelevant occluded region and does not use the occluded region in future processing operations. In some cases, if an occluded region is on the vehicle's path and/or trajectory (e.g., a candidate trajectory that is being evaluated), then the system discards the occluded region as an irrelevant occluded region and does not use the occluded region in future processing operations. Discarding occluded regions on the vehicle's path may be because it is unlikely that the vehicle will fail to detect any objects in the occluded region in its future path.

In some cases, the system may process sensor data associated with a vehicle environment to determine, for a location (e.g., each location in a geographic range of the vehicle location, each location that is part of a road, and/or the like) in the vehicle environment, a measure of how many sensor(s) associated with the vehicle can capture features of the location (e.g., a measure of sensor data intensity associated with the location, a measure of how many sensors can capture features of the location, and/or the like). The system may then combine the measures for various locations into a data structure such as a grid. In some cases, the system uses the grid to determine occlusions within the vehicle environment. For example, in some cases, the system may determine that each location whose sensor capture measure falls below a threshold is in an occluded region. As another example, in some cases, the system may determine an occluded region by performing a geometric scan (e.g., using raycasting) of the environment data (e.g., map data) associated with the vehicle environment given the field of view(s) of one or more image sensors associated with the vehicle. As another example, in some cases, the system may process a smoothing operation (e.g., using a flood fill algorithm) on the grid to determine a second grid and determine the occluded region(s) based on the second grid. For example, the second grid may determine, for a location (e.g., each location in a geographic range of the vehicle location, each location that is part of a road, and/or the like) in the vehicle environment, a measure of distance of the location to an occluded region (e.g., to the nearest occluded region). In some cases, if the distance measure of an occluded region falls above a threshold, then the system determines that the location is part of an occluded region.

In some cases, as the vehicle is navigating through the environment, the vehicle may generate sensor data representing the environment. The sensor data can include, but is not limited to, lidar data, radar data, image data, time of flight data, sonar data, location data, and/or any other type of data that may be generated by one or more sensors. The vehicle may then analyze the sensor data to determine location(s) of static object(s) and/or location(s) of dynamic object(s) within the environment. Additionally, the vehicle may use the location(s) of the object(s) to determine both region(s) of the environment that are occluded by object(s), which are referred to as the occluded region(s), and region(s) of the environment that are not occluded by object(s), which are referred to as the visible region(s).

For example, the vehicle may determine a grid associated with the occluded region(s) and/or the visible region(s). Techniques such as ray casting may be used to determine which region(s) of the environment represented by the grid are occluded with respect to a location of the vehicle and which region(s) of the environment represented by the grid are not occluded with respect to the location of the vehicle. In some examples, different techniques for determining occluded region(s) and/or visible region(s) may be used based on various sensor modalities. As a non-limiting example, ray casting may be used to determine occluded region(s) and/or visible region(s) for lidar sensors, whereas image projections using camera matrices may be used for determining occluded region(s) and/or visible region(s) of image sensors. The grid may be three-dimensional and may represent a prediction of object(s) in voxels that describe volume(s) of the object(s) in the environment. Techniques for generating a grid may be found, for example, in U.S. patent application Ser. No. 16/011,436 titled "Occlusion Aware Planning" and filed Jun. 18, 2018, which is incorporated by reference herein in its entirety. Further, techniques for determining occluded regions and predicted occluded regions may be found, for example, in U.S. patent application Ser. No. 16/246,208 titled "Occlusion Prediction and Trajectory Evaluation" and filed Jan. 11, 2019, and U.S. patent application Ser. No. 16/399,743, titled "Predicting an Occupancy Associated with Occluded Region" and filed Apr. 30, 2019, which are incorporated by reference herein in their entirety.

In some instances, the occluded region(s) and/or the visible region(s) may be represented in the environment in a top-down representation of the environment, for example, which may comprise other sensor data captured by the vehicle.

In some cases, the techniques described herein include determining a time-to-collision measure (e.g., a minimum time-to-collision measure) for a location in the vehicle environment. The time-to-collision measure may represent a minimum amount of time required to travel from any of one or more detected occluded regions (e.g., one or more relevant occluded regions that are determined by scanning one or more intersecting road segments associated with intersections) to a location in the vehicle environment. In some cases, a location in a vehicle environment with R occluded regions (e.g., R relevant occluded regions) is associated with R travel times, each representing a predicted time for traveling from a respective one of the occluded regions to the location. In some cases, the location's time-to-collision measure is determined based on the smallest value from the R travel times associated with the location.

In some cases, the travel time associated with a location and an occluded region is determined based on a distance between the location and the occluded region as well as a velocity measure (e.g., a speed limit) associated with the path between the location and the occluded region. In some cases, the travel time is determined based on the distance between a location and a nearest point of the occluded region as well as a velocity measure (e.g., a speed limit) associated with the path between the location and the occluded region. In some cases, the travel time is determined based on the shortest time to travel from the occluded region to the location assuming a velocity measure (e.g., a speed limit).

In some cases, after an intersecting road segment is determined, the system detects a sampled location (e.g., a set of sampled locations) along the road segment. For example, the system may determine M sampled locations along the intersecting road segment based on dividing the length of the road segment into M parts and choosing a location associated with each part, where M may be a predefined value that is common across all intersecting road segments. As another example, the system may determine sampled locations by selecting them in a manner such that two consecutive sampled locations are separated by a required distance. As a further example, the system may determine sampled locations by selecting them in a manner such that two consecutive sampled locations are separated by a required distance but may not select more than a threshold number of sampled locations. As an additional example, the system may randomly determine locations of the sampled locations.

In some cases, after determining a sampled location along an intersecting road segment, the system may determine a time-to-collision measure associated with the sampled location (e.g., using at least one of the techniques described herein). The time-to-collision measure associated with a sampled location may represent at least one of: (i) whether the intersecting road segment includes an occluded region, (ii) whether the intersecting road segment includes an occluded region between the sampled location and a scanned boundary of the intersecting road segment (as further described below), or (iii) a measure of expected time for an object (e.g., a vehicle) to travel from the occluded region to the sampled location. In some cases, the system stores the time-to-collision measure associated with a sampled location in a data structure, such as a 2D matrix that describes the time-to-collision measures for all of the sampled locations associated with all of the detected intersecting road segments. For example, if R intersecting road segments are detected and each road segment is used to determine at most T sampled locations, then an R×T matrix with R×T time-to-collision measures may be generated. In some cases, this R×T matrix is provided to a model (e.g., a machine learning model) that is configured to provide, as an output, a heatmap of costs associated with the vehicle environment. In some cases, each cost value described by the heatmap is a minimum time to collision measure that represents a prediction about the earliest time in the future at which an occluded object is expected to reach a corresponding location in the vehicle environment.

In some cases, after determining a sampled location along an intersecting road segment, the system may scan starting from the sampled location in a direction opposite of the direction associated with the sampled location in relation to the intersecting road segment. In some cases, the scanning stops at the earlier of: (i) the scanned boundary of a scanned length of the intersecting road segment, (ii) detection of an occluded region, or (iii) detection of at least one stopping condition.

As described above, the intersecting road segment may be generated by scanning a road that intersects with an intersection until a terminating condition is reached. Accordingly, the scanned boundary of the scanned length of the intersecting road segment may be determined based on a location at which a terminating condition is reached. In some cases, the scanned boundary of an intersecting road segment is the location at which a terminating condition is reached while scanning the intersecting road segment in the opposite of the direction. For example, in some cases, if a road segment is moving in a west-to-east direction, then the scanned boundary of the road segment is the west-side scanned boundary of the road segment, or the point at which scanning the road segment stopped.

In some cases, if a scan starting from a sampled location that is along an intersecting road segment reaches the scanned boundary of the intersecting road segment without detecting any occluded regions and/or any stopping conditions, the system determines that the sampled location is associated with a predefined time-to-collision measure, such as a predefined high time-to-collision measure, a maximum time-to-collision measure, a time-to-collision measure of positive infinity, or an undefined time-to-collision measure. In some cases, setting the time-to-collision measure of a sampling whose respective scan does not detect any occluded regions to the predefined time-to-collision measure is configured to indicate that the sampled location is not expected to occupy an occluded object that traverses the intersecting road segment.

In some cases, if a scan starting from a sampled location that is along an intersecting road segment reaches a stopping condition, the system determines that the sampled location is associated with a predefined time-to-collision measure, such as a predefined high time-to-collision measure, a maximum time-to-collision measure, a time-to-collision measure of positive infinity, or an undefined time-to-collision measure. Examples of stopping conditions include detection (e.g., based on sensor data) that a dynamic object (e.g., a moving object, such as a moving vehicle) that is moving on the intersecting road segment in the direction of travel, detection of a roadway feature such as an object used to block the road, detection of a road condition such as heavy traffic or road blockage, and/or the like. In some cases, if the system determines that there is a dynamic object between sampled location and the scanned boundary of the relevant intersecting road segment, the system determines that the sampled location is not expected to occupy an occluded object that traverses the intersecting road segment, regardless of whether an occluded region is detected between the location of the dynamic object and the segment scanned boundary. This determination may result from the assumption that any occluded object will be blocked by the dynamic object and arrive later than the dynamic object, which is in the visible region.

In some cases, if a scan starting from a first sampled location that is along an intersecting road segment reaches an occluded region before reaching the segment scanned boundary or any stopping conditions, the system computes a time-to-collision measure based on a distance between the first sampled location and the occluded region. The time-to-collision measure for a given sampled location may, for example, be calculated by: (i) for each intermediate sampled location that is between the given sampled location and the occluded region, determining a distance-to-speed ratio as the ratio of: (a) the distance between the intermediate sampled location and a previous sampled location in accordance with the direction of travel (e.g., which may be a fixed sampling distance), and (b) a measure of velocity (e.g., a speed limit, an average speed, and/or the like) associated with the region that includes the intermediate sampled location and its previous sampled location; and (ii) summing over the distance-to-speed ratios of all of the intermediate sampled locations (e.g., to account for all of the sampled locations between the given sampled location and the occluded region). For example, for a third-to-last sampled location along an intersecting road segment, the time-to-collision measure may be determined by summing: (i) ratio of a distance between the third-to-last sampled location and the second-to-last sampled location over the relevant speed limit, (ii) ratio of a distance between the second-to-last sampled location and the first-to-last sampled location over the relevant speed limit, and (iii) ratio of a distance between the first-to-last sampled location and the occluded region over the relevant speed limit.

In some cases, the techniques described herein include determining an occluded collision cost for a candidate trajectory. The occluded collision cost may represent a predicted risk of colliding with an object in an occluded region given a trajectory. The occluded collision cost may be used (e.g., along with one or more other cost measures) to evaluate a candidate trajectory relative to other candidate trajectories.

In some cases, the occluded collision cost for a candidate trajectory is determined based on a deviation of: (i) the time-to-collision measure for a location along the candidate trajectory, and (ii) a time at which the vehicle is expected to reach the location in accordance with the candidate trajectory. In some cases, the deviation measures for a set of locations along the trajectory are combined to determine the occluded collision for the trajectory (e.g., in a manner configured to weight deviation measures of locations that are expected to be reached later in accordance with the trajectory less than deviation measures of locations that are expected to be reached earlier in accordance with the trajectory). For example, if a trajectory includes three locations, then the system may determine the occluded collision cost for the trajectory based on: (i) a deviation between the time-to-collision measure for the first location and a time at which the vehicle is expected to arrive at the first location, (ii) a deviation between the time-to-collision measure for the second location and a time at which the vehicle is expected to arrive at the second location, and (iii) a deviation between the time-to-collision measure for the third location and a time at which the vehicle is expected to arrive at the third location.

In some cases, if a deviation measure falls above threshold, the occluded collision cost for the location is set to a predefined low value such as zero and/or given a relatively lower weight. In some cases, if the vehicle is expected to have right-of-way and/or highest yield permissibility at a location, the occluded collision cost for the location is set to a predefined low value such as zero and/or given a relatively lower weight. In some cases, if the vehicle is expected to have a speed that falls below a threshold at a location, the occluded collision cost for the location is set to a predefined low value such as zero and/or given a relatively lower weight.

In some cases, the techniques described herein enable evaluating vehicle paths and/or candidate trajectories based on safety considerations related to potential collisions with occluded objects, thereby enhancing safety in challenging visibility conditions. This capability allows the system to anticipate potential collision risks with occluded objects, such as vehicles obstructed by buildings, trees, or other vehicles. By factoring in these safety considerations during path evaluation, the system can dynamically adjust the vehicle's trajectory to avoid or mitigate potential collisions, reducing the likelihood of accidents and enhancing overall safety. This capability is particularly valuable in adverse weather conditions, dense urban areas, or situations where the vehicle's visibility is compromised, providing an additional layer of safety to ensure the well-being of both the occupants and other road users.

In some cases, the techniques described herein improve computational efficiency. For example, by scanning the vehicle's path and detecting intersections within a predetermined distance, the system minimizes the computational burden associated with analyzing the entire road network. This targeted approach allows for efficient intersection detection, as the system only focuses on relevant areas rather than processing extraneous information. Additionally, by adopting a subset of the detected intersections that require further processing, the system reduces unnecessary computational overhead. This optimized utilization of computational resources enables real-time decision-making, making the techniques suitable for resource-constrained environments such as embedded systems in vehicles.

In some cases, by accurately determining the relevant intersections along the vehicle's path, the system can prioritize the analysis and decision-making process for critical points of interaction. This proactive approach improves overall safety by ensuring that the system focuses on intersections where potential conflicts are more likely to occur. By filtering out irrelevant intersections, the system can allocate its resources and attention to the intersections that truly require careful consideration, reducing the risk of overlooking critical situations.

In some cases, the techniques described herein improve memory efficiency. In some cases, instead of storing a comprehensive map of the entire road network, the system relies on map data associated with the vehicle environment to determine the set of intersections along the vehicle's path. This selective utilization of map data reduces the memory footprint required for storing and processing road network information. Furthermore, by filtering out intersections based on specific criteria such as distance and right-of-way, the system eliminates the need to store and process data for irrelevant intersections. This memory-efficient approach minimizes the storage requirements and enhances the system's ability to handle large-scale road networks while operating within memory-constrained environments.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, or in an aerial surveying context. Additionally, the techniques described herein may be used with real data (e.g., captured using sensor(s)), simulated data (e.g., generated by a simulator), or any combination of the two. Example implementations are provided below with reference to the following figures. Although discussed in the context of a vehicle, the methods, apparatuses, and systems described herein can be applied to a variety of prediction systems and are not limited to vehicles.

FIG. 1 depicts an environment 100 in which the techniques described herein may be utilized. As depicted in FIG. 1, the environment 100 can include a vehicle 102 that includes one or more sensor system(s) 104 capturing data representing the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle 102 can be associated with sensor system(s) 104 that can be disposed on the vehicle 102. The sensor system(s) 104 can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor system(s) 104 can generate sensor data, which can be utilized by vehicle computing device(s) 106 associated with the vehicle 102. In at least one example, the vehicle computing device(s) 106 can utilize sensor data in an occlusion monitoring component 108. For example, the occlusion monitoring component 108 can access occlusion data and/or map data to determine occluded regions in a vehicle environment.

In at least one example, the vehicle 102 can store map data 154 on the vehicle's memory 152. The map data may include a comprehensive representation of road networks, landmarks, traffic control devices, and/or other relevant features. By leveraging the map data 154, the occlusion monitoring component 108 can access valuable information about the road layout, potential occluded regions, and other significant spatial details. This enables the system to identify areas where objects may be obstructed from the vehicle's sensors due to various factors such as buildings, vegetation, or other vehicles. The occlusion monitoring component 108 can intelligently analyze the combination of sensor data and map data to determine the presence and extent of occluded regions, contributing to a more comprehensive perception of the environment and aiding in safe decision-making.

By way of example, and without limitation, the vehicle 102 in the environment 100 is traveling along the path 110 that includes the intersections 114A, 114B, 114C, and 114D, resulting from the intersection of the vehicle's path 110 with the path A 112A, path B 112B, path C 112C, and path D 112D. Each of the paths 112A-112D may or may not be currently navigated by an object (e.g., a vehicle). In this example, while the vehicle 102 can use the map data 154 to determine the presence of the intersecting paths and the intersections, and the vehicle can additionally use the sensor data and/or map data to determine that the region 118 is occluded, the vehicle 102 cannot use sensor data alone determine that the occluded region 118 includes the object 120. In some cases, using the techniques described herein, the occlusion monitoring component 108 is configured to determine the likelihood of the object 120 crossing with the path 110 even without obtaining sensor data representing the object 120. To do so, the occlusion monitoring component 108 may perform operations of the process 130.

As depicted in FIG. 1, at operation 132, the process 130 includes determining that the path D 112D is an intersecting road segment that intersects with intersection 114D and scanning the path D 112D until a terminating condition is reached. In some cases, the occlusion monitoring component 108 first determines (e.g., based on map data 154) that path 110 includes the intersection 114D with path D 11D. The occlusion monitoring component 108 may also determine that the intersection 114D is relevant (e.g., is not where a vehicle on the path D 112D will have right-of-way and/or yield permissibility). In some cases, subsequent to determining that the path 110 includes the intersection 114D with path D 11D, the occlusion monitoring component 108 may scan path D 11D until a terminating condition is reached. The terminating condition may be defined based on at least one threshold number of predefined roadway features (e.g., turns, traffic lights, and/or the like) or a threshold distance.

At operation 134, the process 130 includes determining that the path D 112D includes the occluded region 118 and that the occluded region 118 is relevant. In some cases, the occlusion monitoring component 108 determines that the occluded region 118 is relevant based on determining that the autonomous vehicle is expected to yield to a potential object in the occluded region 118. In some cases, the occlusion monitoring component 108 determines that the occluded region 118 is relevant based on determining that the occluded region 118 has an area that equals or exceeds a threshold (e.g., smaller than the size of an object of interest such as a vehicle). In some cases, the occlusion monitoring component 108 determines that the occluded region 118 is relevant based on determining that the occluded region 118 is not behind a dynamic (e.g., moving) object. In some cases, the occlusion monitoring component 108 determines that the occluded region 118 is relevant based on determining that the occluded region 118 is not on the vehicle's path 110.

At operation 136, the process 130 includes determining a heatmap of cost values based on determining that the occluded region 118 is relevant. In some cases, the cost values of the heatmap are generated by sampling locations along path D 112D and determining time-to-collision measures between the sampled locations and the occluded region 118. The minimum time-to-collision measures are then provided to a model that generates the heatmap. Each cost value of a heatmap may represent a minimum time-to-collision of a corresponding location in the environment 100 relative to an object in any of one or more detected occluded regions.

Figure 2:
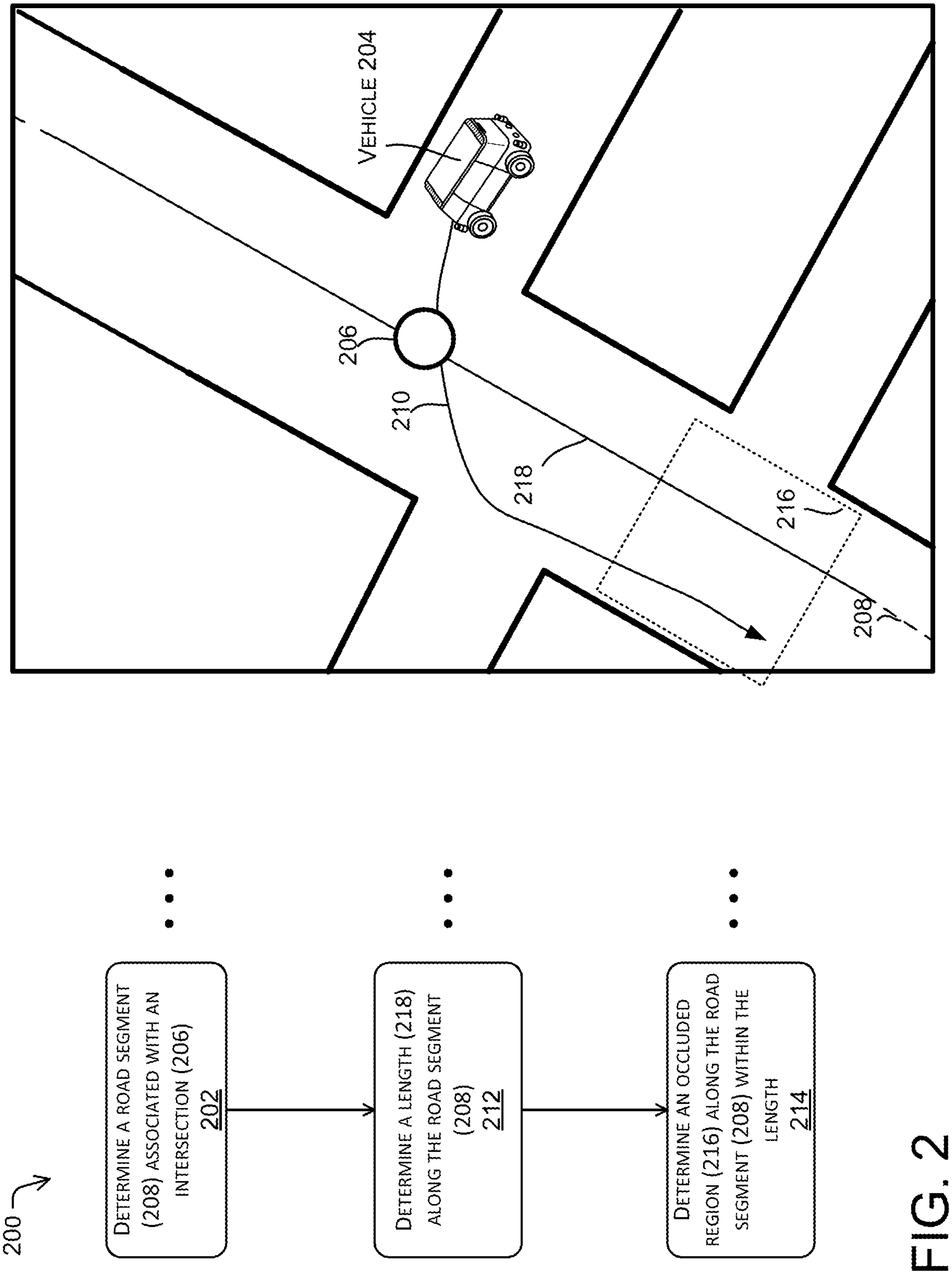
FIG. 2 is a flowchart diagram of an example process for detecting an occluded region.

FIG. 2 is a flowchart diagram of an example process 200 for detecting an occluded region 216. As depicted in FIG. 2, at operation 202, the process 200 includes determining that the path 210 of the vehicle 204 includes the intersection 206. The system may also determine that the vehicle 204 does not have the right-of-way at intersection 206. The system may also determine that the intersection 206 is associated with one or more road segments, such as the road segment 208.

At operation 212, the process 200 includes determining a length 218 along the road segment 208. In some cases, the system scans along the road segment 208 in both directions until a terminating condition is reached. As depicted in FIG. 2, the terminating condition is reached on both ends where the dashed lines begin. The starting point of the dashed lines on both ends may be referred to as scanned boundaries of the road segment 208.

At operation 214, the process 200 includes determining that the scanned length of the road segment 208 includes the occluded region 216. In some cases, the system determines, based on sensor data captured in the vehicle environment, that a portion of the scanned length of the road segment 208 does not have sufficient visibility. Accordingly, that portion is designated as an occluded region 216.

Figure 3:
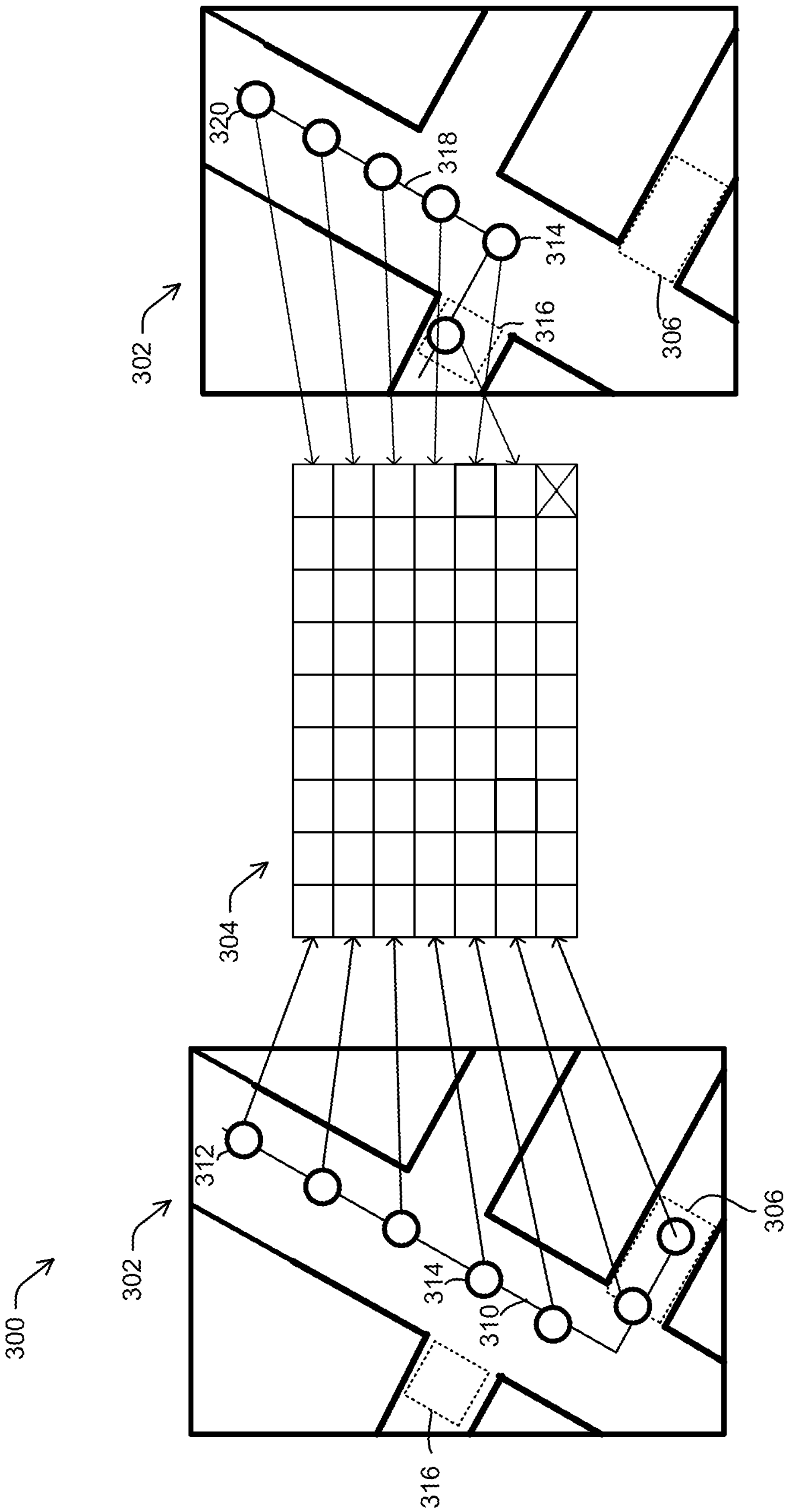
FIG. 3 is an operational example of determining a data structure that includes time-to-collision measures for various sampled locations associated with two road segments 310, 318 associated with the intersection.

FIG. 3 is an operational example 300 of determining a data structure 304 that includes sampled values (e.g., at least one of horizontal coordinates, vertical coordinates, angles, or speed limits) for various sampled locations associated with two road segments 310, 318 associated with the intersection 314. As depicted in FIG. 3, in environment 302, two road segments are identified that intersect with the intersection 314: a first road segment 310 and a second road segment 318. The system has additionally determined that the first road segment 310 includes the occluded region 306 and the second road segment 318 includes the occluded region 316.

As further depicted in FIG. 3, the system has also sampled up to a maximum of seven points along each road segment: in particular, seven sampled locations (including the sampled location 312) along the first road segment 310 and six sampled locations (including the sampled location 320) along the second road segment 318. Each sampled location is associated with a set of sampled values (e.g., a horizontal coordinate, a vertical coordinate, an angle, and/or a speed limit) in the data structure 304 that may be represented by a vector in the data structure 304. After the data structure 304 is generated, the system can process the system to determine a time to collision measure that represents a minimum time for a potential occluded object in the corresponding occluded region to reach the sampled location assuming a given velocity model (e.g., a velocity model determined based on the sampled speed limits).

Figure 4:
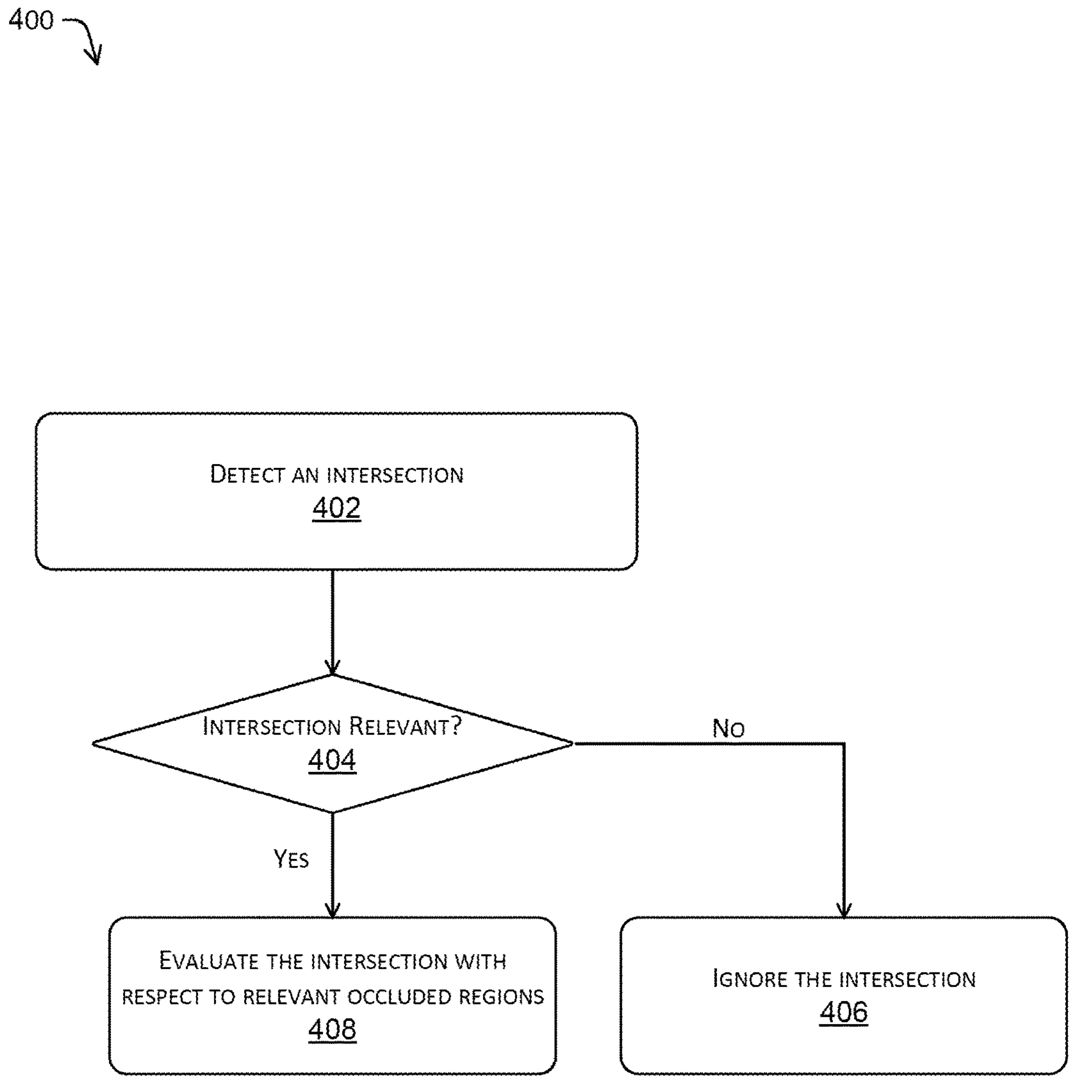
FIG. 4 is a flowchart diagram of a process for performing occlusion monitoring with respect to an intersection.

FIG. 4 is a flowchart diagram of a process 400 for performing occlusion monitoring with respect to an intersection. As depicted in FIG. 4, at operation 402, the process 400 includes detecting the intersection. In some cases, the system retrieves the intersection based on a vehicle path and using map data. In some cases, the system detects the intersection based on sensor data captured from the vehicle environment.

At operation 404, the process 400 includes determining whether the intersection is relevant. In some cases, the system may determine that the intersection is irrelevant if the vehicle's path has right-of-way with respect to the intersection. If the system determines that the intersection is irrelevant, the system proceeds to operation 406 to ignore the intersection for occlusion monitoring analysis. If the system determines that the intersection is relevant, the system determines that the intersection is relevant, the system proceeds to operation 408 to evaluate the intersection with respect to all relevant occluded regions (e.g., as determined based on a heatmap of relevant occluded regions in the vehicle's environment).

In some cases, the system may determine whether an occluded region is relevant based on the size of the occluded region, whether the occluded region is on the vehicle's path, whether there is a dynamic object between the vehicle location and the occluded region, and/or the like.

In some cases, the system determines a time-to-collision measure for a sampled location along the road segment that is associated with a relevant occluded region. In some cases, the system uses the time-to-collision measure to determine a heatmap of cost values associated with the vehicle environment. The heatmap can be used to generate an optimal trajectory for the vehicle and/or to perform safety monitoring with respect to the vehicle.

Figure 5:
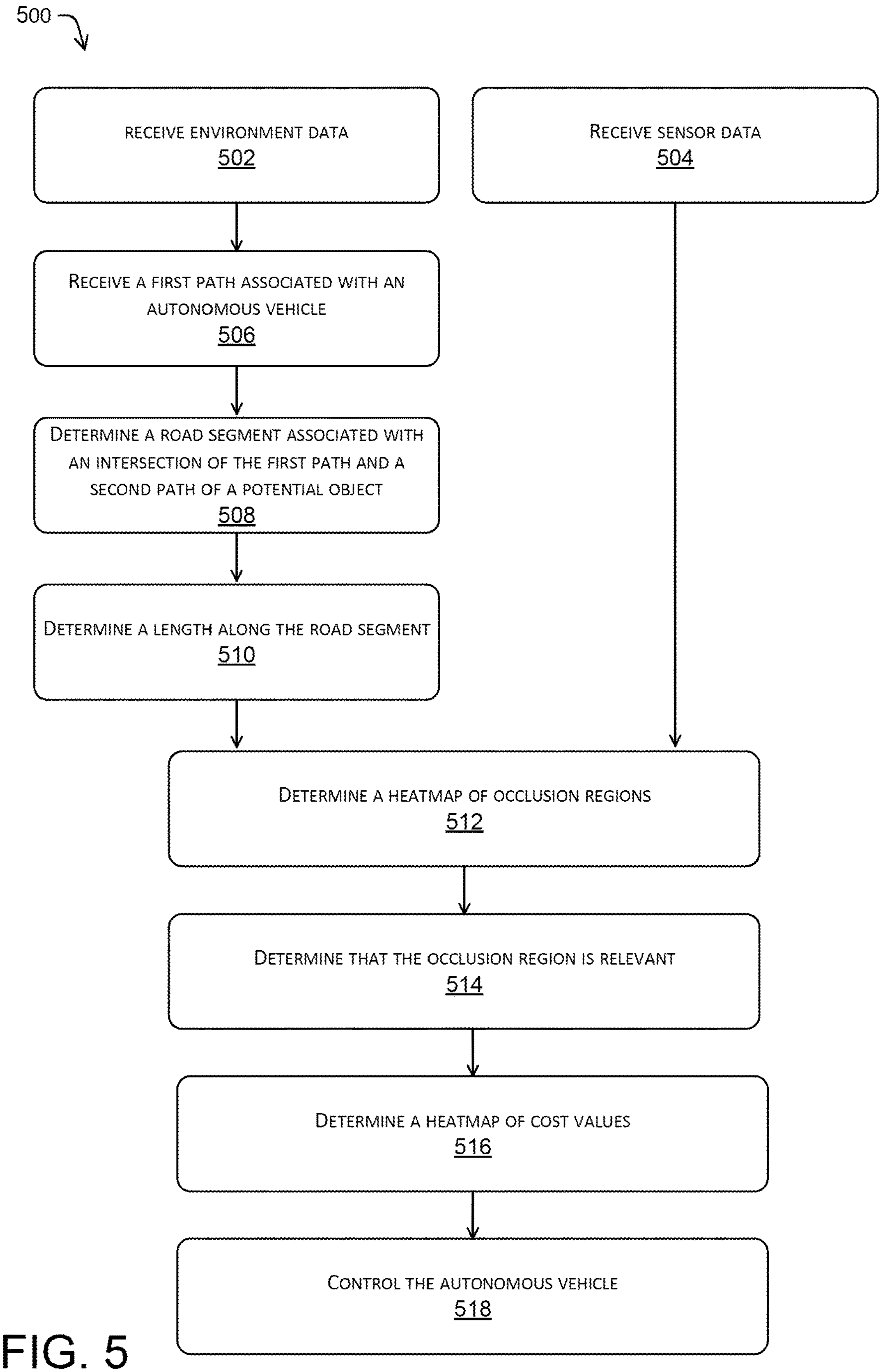
FIG. 5 is a flowchart diagram of an example process for controlling a vehicle based on occlusion monitoring.

FIG. 5 is a flowchart diagram of an example process 500 for controlling a vehicle based on occlusion monitoring. As depicted in FIG. 5, at operation 502, the process 500 includes receiving environment data representing one or more features (e.g., road network features) of the vehicle environment. In some cases, the environment data includes map data.

At operation 504, the process 500 includes receiving sensor data associated with the vehicle. Examples of sensor data include image data, lidar data, radar data, depth measurement data, inertial measurement unit (IMU) data, acceleration data, steering data, and/or the like.

At operation 506, the process 500 includes receiving a first path associated with an autonomous vehicle. The path may be a path that the vehicle is using for navigation. The path may also be associated with a candidate trajectory that is being evaluated.

At operation 508, the process 500 includes determining a road segment associated with an intersection of the first path and the second path of a potential object. In some cases, the road segment is obtained by scanning the road segment in one or both directions.

At operation 510, the process 500 includes determining a length along the road segment. In some cases, the length includes extension of the road segment from one or both directions of the intersection until a terminating condition is reached. The terminating condition may be based on a maximum number of turns or a threshold distance.

At operation 512, the process 500 includes determining a heatmap of occluded regions (e.g., a heatmap of relevant occluded regions) in the vehicle environment. Operation 512 may be performed by a perception component of the vehicle computing device.

In some cases, the system may determine that an occluded region is relevant based on determining that the size of the occluded region exceeds or falls above a threshold, that the occluded region is not on the vehicle's path, that there is no dynamic object between the vehicle location and the occluded region, and/or the like.

At operation 514, the process 500 includes determining a time-to-collision measure for at least one sampled location in the vehicle environment. The time-to-collision measure for a given sampled location may, for example, be calculated by: (i) for each intermediate sampled location that is between the given sampled location and the occluded region, determining a distance-to-speed ratio as the ratio of: (a) the distance between the intermediate sampled location and a previous sampled location in accordance with the direction of travel (e.g., which may be a fixed sampling distance), and (b) a measure of velocity (e.g., a speed limit, an average speed, and/or the like) associated with the region that includes the intermediate sampled location and its previous sampled location; and (ii) summing over the distance-to-speed ratios of all of the intermediate sampled locations (e.g., to account for all of the sampled locations between the given sampled location and the occluded region). In some cases, if a location is sampled more than once (e.g., for two or more segments), the time-to-collision measure is the minimal time-to-collision value for the location.

At operation 516, the process 500 includes determining a heatmap of cost values. In some cases, the system determines a time-to-collision measure for a sampled location along the road segment that is associated with the occluded region. In some cases, the system uses the time-to-collision measure to determine a heatmap of cost values associated with the vehicle environment. The heatmap can be used to generate an optimal trajectory for the vehicle and/or to perform safety monitoring with respect to the vehicle.

At operation 518, the process 500 includes controlling the vehicle based on the heatmap. In some cases, an example system may select a trajectory that minimizes a cost value determined at least in part based on the likelihood that different trajectories will collide with an object in an occluded region and use the trajectory to control the vehicle. In some cases, the system detects that the vehicle's path has an above-threshold likelihood of collision with an object that is assumed to be in the occluded region. Based on this determination, the system may alert the driver and/or require manual intervention by the driver.

Figure 6:
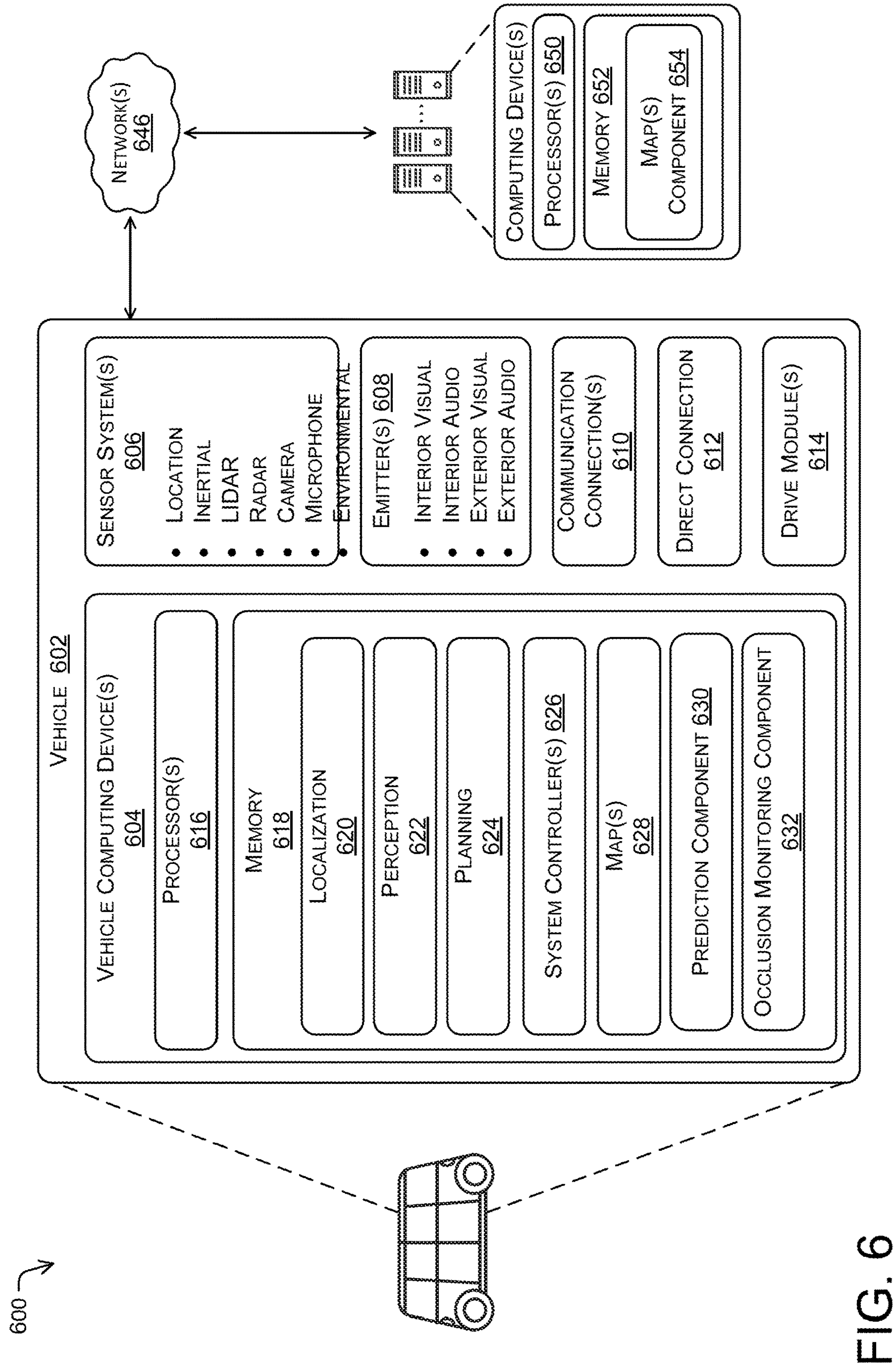
FIG. 6 depicts a block diagram of an example system for implementing the techniques described herein.

FIG. 6 depicts a block diagram of an example system 600 for implementing the techniques described herein. In at least one example, the system 600 can include a vehicle 602, which can correspond to the vehicle 102 in FIG. 1.

The vehicle 602 can include a vehicle computing device 604, one or more sensor systems 606, one or more emitters 608, one or more communication connections 610, at least one direct connection 612, and one or more drive modules 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle, or any other system having at least an image capture device (e.g., a camera enabled smartphone).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for determining to retrieve map data including an occlusion grid from memory, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In some instances, the planning component 624 can generate one or more trajectories for the vehicle 602 based at least in part on states of occlusion field(s) and/or occlusion grids, as discussed herein. In some examples, the planning component 624 can use temporal logic, such as linear temporal logic and/or signal temporal logic, to evaluate one or more trajectories of the vehicle 602. Details of utilizing temporal logic in the planning component 624 are discussed in U.S. application Ser. No. 15/632,147, which is herein incorporated by reference, in its entirety.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive module(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 628 can include at least one map (e.g., images and/or a mesh). In some examples, the vehicle 602 can be controlled based at least in part on the maps 628. That is, the maps 628 can be used in connection with the localization component 620, the perception component 622, and/or the planning component 624 to determine a location of the vehicle 602, identify objects in an environment, and/or generate routes and/or trajectories to navigate within an environment.

In some examples, the one or more maps 628 can be stored on a remote computing device(s) (such as the computing device(s) 648) accessible via network(s) 646. In some examples, multiple maps 628 can be stored based on, for example, a characteristic (e.g., type of entity, time of day, day of week, season of the year, etc.). Storing multiple maps 628 can have similar memory requirements, but increase the speed at which data in a map can be accessed.

In some examples, the one or more maps 628 can store occlusion grids associated with individual locations in an environment. For example, as the vehicle 602 traverses the environment and as maps representing an area proximate to the vehicle 602 are loaded into memory, one or more occlusion grids associated with a location can be loaded into memory as well.

In some examples, the prediction component 630 can include functionality to generate predicted trajectories of objects in an environment. For example, the prediction component 630 can generate one or more predicted trajectories for vehicles, pedestrians, animals, and the like within a threshold distance from the vehicle 602.

In general, the occlusion monitoring component 632 can include functionality to generate and/or access occlusion grid data, determine occluded and un-occluded regions of an occlusion grid, and to determine occlusion states and/or occupancy states for occlusion fields of an occlusion grid. In some instances, the occlusion monitoring component 632 can correspond to the occlusion monitoring component 108 of FIG. 1. As discussed herein, the occlusion monitoring component 632 can receive LIDAR data, image data, map data, and the like to determine occlusion-related information in an environment. In some instances, the occlusion monitoring component 632 can provide occlusion information to the planning component 624 to determine when to control the vehicle 602 to traverse an environment. occlusion monitoring component 632 can provide occlusion information to the prediction component 630 to generate predicted trajectories for one or more objects in an occlusion region in an environment. Additional details of the occlusion monitoring component 632 are discussed in connection with the remaining components stored in the memory 618.

In some instances, aspects of some or all of the components discussed herein can include any models, algorithms, and/or machine learning algorithms. For example, in some instances, the components in the memory 618 (and the memory 652, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 606 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally or alternatively, the sensor system(s) 606 can send sensor data, via the one or more networks 646, to the one or more computing device(s) at a particular frequency, after a lapse of a predetermined period of time, in near real-time, etc. In some instances, the sensor system(s) 606 can correspond to the sensor system(s) 104 of FIG. 1.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive module(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 646. For example, the communications connection(s) 610 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 602 can include one or more drive modules 614. In some examples, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive module(s) 614 can include one or more sensor systems to detect conditions of the drive module(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 614. In some cases, the sensor system(s) on the drive module(s) 614 can overlap or supplement corresponding systems of the vehicle 602 (e.g., sensor system(s) 606).

The drive module(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 614. Furthermore, the drive module(s) 614 also include one or more communication connection(s) that enable communication by the respective drive module with one or more other local or remote computing device(s).

In at least one example, the direct connection 612 can provide a physical interface to couple the one or more drive module(s) 614 with the body of the vehicle 602. For example, the direction connection 612 can allow the transfer of energy, fluids, air, data, etc. between the drive module(s) 614 and the vehicle. In some instances, the direct connection 612 can further releasably secure the drive module(s) 614 to the body of the vehicle 602.

In some examples, the vehicle 602 can send sensor data to one or more computing device(s) 648 via the network(s) 646. In some examples, the vehicle 602 can send raw sensor data to the computing device(s) 648. In other examples, the vehicle 602 can send processed sensor data and/or representations of sensor data to the computing device(s) 648. In some examples, the vehicle 602 can send sensor data to the computing device(s) 648 at a particular frequency, after a lapse of a predetermined period of time, in near real-time, etc. In some cases, the vehicle 602 can send sensor data (raw or processed) to the computing device(s) 648 as one or more log files.

The computing device(s) 648 can include processor(s) 650 and a memory 652 storing a maps(s) component 654.

In some instances, the map(s) component 654 can include functionality to associate occlusion grid(s) with map locations. In some instances, the map(s) component 654 can identify intersections where a vehicle approaching the intersection does not have a right of way, for example, and can generate an occlusion grid for that location. In some instances, the map(s) component 654 can identify topographic occlusion regions caused by a crest of a hill, for example, that may reduce a visibility of the vehicle 602. In some instances, and as discussed in connection with FIG. 6, for example, a size of the occlusion grid can be based at least in part on region characteristics such as a distance of an intersection, a speed limit, a speed limit safety factor, and the like.

The processor(s) 616 of the vehicle 602 and the processor(s) 650 of the computing device(s) 648 can be any suitable processor capable of executing instructions to process data and perform operations as described herein. By way of example and not limitation, the processor(s) 616 and 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 652 are examples of non-transitory computer-readable media. The memory 618 and 652 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 648 and/or components of the computing device(s) 648 can be associated with the vehicle 602. That is, the vehicle 602 can perform one or more of the functions associated with the computing device(s) 648, and vice versa. Further, aspects of the occlusion monitoring component 632 and/or the prediction component 630 can be performed on any of the devices discussed herein.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders and/or steps may be omitted. Additionally, various computations that are herein need not be performed in the order disclosed, and other examples using alternative orderings of the computations could be readily implemented. In addition to being reordered, the computations could also be decomposed into sub-computations with the same results.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving a path associated with an autonomous vehicle traversing an environment; detecting a road segment associated with an intersection of the path and a path of a potential object; determining that the intersection is relevant;

determining, based at least in part on a termination condition, a length along the road segment and a number of additional road segments proximate to the road segment; determining, based on environment data and sensor data associated with the autonomous vehicle, an occluded region within the length; determining, based on a minimum time to collision and determining that the occluded region is relevant, a heatmap of cost values associated with the occluded region; and controlling the autonomous vehicle based on the heatmap.

B: The system of paragraph A, wherein the termination condition comprises one or more of: a maximum distance from the intersection, a travel time to or from the intersection, or a maximum number of turns.

C: The system of paragraph A or B, wherein determining whether the intersection is relevant comprises determining whether the autonomous vehicle is expected to yield to the potential object.

D: The system of paragraph C, wherein determining whether the autonomous vehicle is expected to yield comprises determining a presence of one or more of: a right on red intersection, an unprotected left intersection, the autonomous vehicle leaving a parking lane or spot, the autonomous vehicle entering an oncoming lane, a yield sign, or a stop sign.

E: The system of any of paragraphs A-D, wherein: the heatmap is a first heatmap, the operations further comprise determining a second heatmap, and controlling the autonomous vehicle is further based at least in part on the second heatmap.

F: One or more non-transitory computer-readable media storing instructions executable by one or more processors, wherein the instructions, when executed, cause the one or more processors to perform operations comprising: detecting a road segment associated with an intersection of a path associated with a vehicle traversing an environment and a path of a potential object; determining whether the intersection is relevant; determining, based at least in part on a termination condition, a length along the road segment and a number of additional road segments proximate to the road segment; determining, based on environment data and sensor data associated with the vehicle, an occluded region associated with the length; determining a cost value based on determining that the occluded region is relevant; and controlling the vehicle based on the cost value.

G: The one or more non-transitory computer-readable media of paragraph F, wherein determining the occluded region comprises: determining a length along the road segment based at least in part on one or more of: (i) a road boundary, (ii) a maximum distance, (iii) a maximum number of turns, or (iv) a travel time to or from the intersection; and determining the occluded region within the length.

H: The one or more non-transitory computer-readable media of paragraph F or G, wherein: determining that the intersection is relevant comprises determining whether the vehicle is expected to yield to the potential object, and determining whether the vehicle is expected to yield comprises determining a presence of one or more of: a right on red intersection, an unprotected left intersection, the vehicle leaving a parking lane or spot, the vehicle entering an oncoming lane, a yield sign, or a stop sign.

I: The one or more non-transitory computer-readable media of any of paragraphs F-H, the operations further comprising determining that an area of the occluded region exceeds a threshold.

J: The one or more non-transitory computer-readable media of any of paragraphs F-I, the operations further comprising determining that the intersection is off of the path associated with the vehicle.

K: The one or more non-transitory computer-readable media of any of paragraphs F-J, the operations further comprising determining, based on sensor data, absence of a dynamic object within the length and between the vehicle and the occluded region.

L: The one or more non-transitory computer-readable media of any of paragraphs F-K, wherein determining the cost value comprises: determining a location within the length; determining a time at which the potential object is expected to reach the location; and determining, based on the time, the cost value.

M: The one or more non-transitory computer-readable media of any of paragraphs F-L, wherein controlling the vehicle comprises: determining a heatmap of cost values based on the cost value; and controlling the vehicle based on the heatmap.

N: A method comprising: detecting a road segment associated with an intersection of a path associated with a vehicle traversing an environment and a path of a potential object; determining whether the intersection is relevant; determining, based at least in part on a termination condition, a length along the road segment and a number of additional road segments proximate to the road segment; determining, based on environment data and sensor data associated with the vehicle, an occluded region within the length; determining a cost value based on determining that the occluded region is relevant; and controlling the vehicle based on the cost value.

O: The method of paragraph N, wherein determining the occluded region comprises: determining a length along the road segment based at least in part on one or more of: (i) a road boundary, (ii) a maximum distance, (iii) a maximum number of turns, or (iv) a travel time to or from the intersection; and determining the occluded region within the length.

P: The method of paragraph N or O, wherein: determining that the intersection is relevant comprises determining whether the vehicle is expected to yield to the potential object; and determining whether the vehicle is expected to yield comprises determining a presence of one or more of: a right on red intersection, an unprotected left intersection, the vehicle leaving a parking lane or spot, the vehicle entering an oncoming lane, a yield sign, or a stop sign.

Q: The method of any of paragraphs N-P, further comprising determining that an area of the occluded region exceeds a threshold.

R: The method of any of paragraphs N-Q, further comprising determining that the intersection is off the path associated with the vehicle.

S: The method of any of paragraphs N-R, wherein further comprising determining, based on sensor data, absence of a dynamic object within the length and between the vehicle and the occluded region.

T: The method of any of paragraphs N-S, wherein determining the cost value comprises: determining a location within the length; determining a time at which the potential object is expected to reach the location; and determining, based on the time, the cost value.

What is claimed is:

1. A system comprising:

one or more processors; and one or more non-transitory computer-readable media storing computer-executable instructions that, when executed, cause the one or more processors to perform operations comprising:

receiving a path associated with an autonomous vehicle traversing an environment;

detecting a road segment associated with an intersection of the path and a path of a potential object;

determining that the intersection satisfies a relevance condition, wherein the relevance condition indicates to process the intersection for a potential occlusion;

determining, based at least in part on a termination condition and the intersection satisfying the relevance condition, a length along the road segment and a set of additional road segments, wherein at least one of the set of additional road segments connects to the road segment, wherein the termination condition is defined based on one or more of a threshold number of predefined roadway features or a threshold distance;

determining, based on environment data and sensor data associated with the autonomous vehicle, an occluded region within the length;

determining, based on a minimum time to collision and determining that the occluded region is relevant, a heatmap of cost values associated with the occluded region, wherein a cost value in the heatmap represents a prediction about how long it will take for an occluded vehicle to arrive at a first position associated with the intersection from a second position associated with the occluded region; and controlling the autonomous vehicle based on the heatmap.

2. The system of claim 1, wherein the termination condition comprises one or more of:

the threshold distance from the intersection to a terminating position associated with the termination condition, a first travel time to the intersection from the terminating position, a second travel time from the intersection to the terminating position, or a threshold number of turns between the intersection and the terminating position.

3. The system of claim 1, wherein determining whether the intersection is relevant comprises determining whether the autonomous vehicle is expected to yield to the potential object.

4. The system of claim 3, wherein determining whether the autonomous vehicle is expected to yield comprises determining a presence of one or more of:

a right on red intersection, an unprotected left intersection, the autonomous vehicle leaving a parking lane or spot, the autonomous vehicle entering an oncoming lane, a yield sign, or a stop sign.

5. The system of claim 1, wherein:

the heatmap is a first heatmap, the operations further comprise determining a second heatmap, and controlling the autonomous vehicle is further based at least in part on the second heatmap.

6. One or more non-transitory computer-readable media storing instructions executable by one or more processors, wherein the instructions, when executed, cause the one or more processors to perform operations comprising:

detecting a road segment associated with an intersection of a path associated with a vehicle traversing an environment and a path of a potential object;

determining that the intersection is a relevant intersection based at least in part on determining that the intersection satisfies a relevance condition, wherein the relevance condition indicates to process the intersection for a potential occlusion;

determining, based at least in part on a termination condition, a length along the road segment and a set of additional road segments, wherein at least one of the set of additional road segments connects to the road segment, wherein the road segment is at least partially within a boundary of the relevant intersection;

determining, based on environment data and sensor data associated with the vehicle, an occluded region associated with the length along the road segment and the set of additional road segments;

determining a cost value based on determining that the occluded region is relevant, wherein the cost value represents a prediction about how long it will take for an occluded vehicle to arrive at a first position associated with the intersection from a second position associated with the occluded region; and controlling the vehicle based on the cost value.

7. The one or more non-transitory computer-readable media of claim 6, wherein determining the length comprises:

determining the length along the road segment based at least in part on one or more of: (i) a road boundary, (ii) a maximum distance, (iii) a maximum number of turns, or (iv) a travel time to or from the intersection; and determining the occluded region within the length.

8. The one or more non-transitory computer-readable media of claim 6, wherein:

determining that the intersection is relevant comprises determining whether the vehicle is expected to yield to the potential object, and determining whether the vehicle is expected to yield comprises determining a presence of one or more of:

a right on red intersection, an unprotected left intersection, the vehicle leaving a parking lane or spot, the vehicle entering an oncoming lane, a yield sign, or a stop sign.

9. The one or more non-transitory computer-readable media of claim 6, the operations further comprising determining that an area of the occluded region exceeds a threshold.

10. The one or more non-transitory computer-readable media of claim 6, the operations further comprising determining that the intersection is off of the path associated with the vehicle.

11. The one or more non-transitory computer-readable media of claim 6, the operations further comprising determining, based on the sensor data, absence of a dynamic object within the length and between the vehicle and the occluded region.

12. The one or more non-transitory computer-readable media of claim 6, wherein determining the cost value comprises:

determining a location within the length;

determining a time at which the potential object is expected to reach the location; and determining, based on the time, the cost value.

13. The one or more non-transitory computer-readable media of claim 6, wherein controlling the vehicle comprises:

determining a heatmap of cost values based on the cost value; and controlling the vehicle based on the heatmap.

14. A method comprising:

detecting a road segment associated with an intersection of a path associated with a vehicle traversing an environment and a path of a potential object;

determining that the intersection is a relevant intersection based at least in part on determining that the intersection satisfies a relevance condition, wherein the relevance condition indicates to process the intersection for a potential occlusion;

determining, based at least in part on a termination condition, a length along the road segment and a set of additional road segments, wherein at least one of the set of additional road segments connects to the road segment, wherein the road segment is at least partially within a boundary of the relevant intersection;

determining, based on environment data and sensor data associated with the vehicle, an occluded region associated with the length along the road segment and the set of additional road segments;

determining, based on the environment data and the sensor data associated with the vehicle, the occluded region within the length;

determining a cost value based on determining that the occluded region is relevant, wherein the cost value represents a prediction about how long it will take for an occluded vehicle to arrive at a first position associated with the intersection from a second position associated with the occluded region; and controlling the vehicle based on the cost value.

15. The method of claim 14, wherein determining the length comprises:

determining the length along the road segment based at least in part on one or more of: (i) a road boundary, (ii) a maximum distance, (iii) a maximum number of turns, or (iv) a travel time to or from the intersection; and determining the occluded region within the length.

16. The method of claim 14, wherein:

determining that the intersection is relevant comprises determining whether the vehicle is expected to yield to the potential object; and determining whether the vehicle is expected to yield comprises determining a presence of one or more of:

a right on red intersection, an unprotected left intersection, the vehicle leaving a parking lane or spot, the vehicle entering an oncoming lane, a yield sign, or a stop sign.

17. The method of claim 14, further comprising determining that an area of the occluded region exceeds a threshold.

18. The method of claim 14, further comprising determining that the intersection is off the path associated with the vehicle.

19. The method of claim 14, wherein further comprising determining, based on the sensor data, absence of a dynamic object within the length and between the vehicle and the occluded region.

20. The method of claim 14, wherein determining the cost value comprises:

determining a location within the length;

determining a time at which the potential object is expected to reach the location; and determining, based on the time, the cost value.

* * * * *